US006885874B2

(12) United States Patent
Grube et al.

(10) Patent No.: US 6,885,874 B2
(45) Date of Patent: Apr. 26, 2005

(54) GROUP LOCATION AND ROUTE SHARING SYSTEM FOR COMMUNICATION UNITS IN A TRUNKED COMMUNICATION SYSTEM

(75) Inventors: Gary W. Grube, Barrington, IL (US); Leslie Gabor Seymour, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 36 days.

(21) Appl. No.: 09/995,231

(22) Filed: Nov. 27, 2001

(65) Prior Publication Data

US 2003/0100326 A1 May 29, 2003

(51) Int. Cl.[7] .............................. H04Q 7/20; H04B 7/00
(52) U.S. Cl. ................. 455/520; 455/404.2; 455/456.1; 455/519; 455/518
(58) Field of Search .......................... 455/515, 41, 518, 455/519, 507, 414, 566, 456.1, 456.2, 456.3, 456.5, 456.6, 457, 404.1, 404.2, 520

(56) References Cited

U.S. PATENT DOCUMENTS

| | | | | |
|---|---|---|---|---|
| 5,530,914 A | * | 6/1996 | McPheters | 455/518 |
| 5,689,809 A | | 11/1997 | Grube et al. | |
| 5,924,041 A | * | 7/1999 | Alperovich et al. | 455/456 |
| 6,167,255 A | * | 12/2000 | Kennedy et al. | 455/414 |
| 6,204,844 B1 | * | 3/2001 | Fumarolo et al. | 345/736 |
| 6,240,069 B1 | * | 5/2001 | Alperovich et al. | 370/260 |
| 6,287,200 B1 | * | 9/2001 | Sharma | 463/40 |
| 6,662,016 B1 | * | 12/2003 | Buckham et al. | 455/457 |

OTHER PUBLICATIONS

Peretz, Sr. Editor, allNetDevices.com, Interoperable Wireless Instant Messaging Platform Released, May 31, 2001, 2 pages.

Crocker, Diacakis, Mazzoldi, Huitema, Klyne, Rose, Rosenberg, Sparks, Sugano, A Common Profile for Instant Messaging (CPIM), Internet Draft, Nov., 2000, 33 pages, Fujitsu Laboratories, Ltd.

Alex Hopmann, Minutes from IETF BoF, Monday Mar. 30, 1998, 5 pages.

Wang, Bahl, Russell, The SIMBA User Alert Service Architecture for Dependable Alert Delivery, Technical Report, Mar. 26, 2001, 11 pages, Microsoft Research, Microsoft Corporation, Redmond, Va.

Boulton, Handset Makers Forge Instant Messaging Alliance, Apr. 26, 2001, 4 pages, Internet News.

Meloan, Leading the Way: MapInfo Location Information Systems Powered by Java™ Technology, Jun. 6, 2001, 7 pages, 2001 JaveOne[SM] Conference.

(Continued)

*Primary Examiner*—Lee Nguyen
*Assistant Examiner*—Lewis West
(74) *Attorney, Agent, or Firm*—Steven R. Santema; Terri S. Hughes; Indira Saladi

(57) ABSTRACT

Methods are disclosed for sharing location and route information between communication units (e.g., talkgroup members) that are subscribed to a group location sharing service. The group location sharing service is event-based, such that the communication units may form a subset of a talkgroup desiring to actively participate or monitor an event. Communication units de-subscribe from the group location sharing service or talkgroup when they no longer desire to participate or monitor the event. Service levels may be determined for various subscribers to the group location sharing service. The service levels may include, for example, an information transmission service level and information reception service level that determine an amount, type, and/or timing of information to be sent or received by particular subscribers.

22 Claims, 10 Drawing Sheets

OTHER PUBLICATIONS

Day, Aggarwal, Mohr, Vincent, Instant Messaging/Presence Protocol Requirements, Feb., 2000, 23 pages, Internet Draft, The Internet Society (2000).

Li, Godefroid, Herbsleb, Jategaonkar–Jagadeesan, Engineering Collaborative Applications: A Framework for Modeling and Verifying Data Access Policies, 3 pages, Department of Computer Science, University of California, LA and Bell Labs, Lucent Technologies, Naperville, IL.

MessageVine Introduces New Instant Messaging Platform with Unparalleled Privacy Features, posted in TECS Mar. 16, 2001, 2 pages, New York.

Santa Ynez Valley Amateur Radio APRS (Automatic Position Reporting System) http://ariel.syv.com/hams/si/ap, May 31, 2000, 3 pages.

Reardon, The OVMRC Rambler, Comments From Our President, VE3GUU, vol. 42, No. 8, Apr., 1998, 9 pages, Ottawa Valley Mobile Radio Club, Inc.

McCarthy, Meidel, ActiveMap: A Visualization Tool for Location Awareness to Support Informal Interactions, Center for Strategic Technology Research (CSTaR), Northbrook, IL, 13 pages.

Harter, Hopper, A Distributed Location System for the Active Office, Nov., 1993, 17 pages, Olivetti Research Ltd, Cambridge, UK, and University of Cambridge Computer Laboratory, Cambridge, UK.

Othelius, Lindberg, & Heine, mobilePosition, a SignalSoft company, launches friendPosition® to Swedish mobile operator, Nov. 14, 2001, Boulder, CO, Press Release, 2 pages.

iCUC™ Instant Messaging Services Website, http://www.icuc.com/, 4 pages.

* cited by examiner

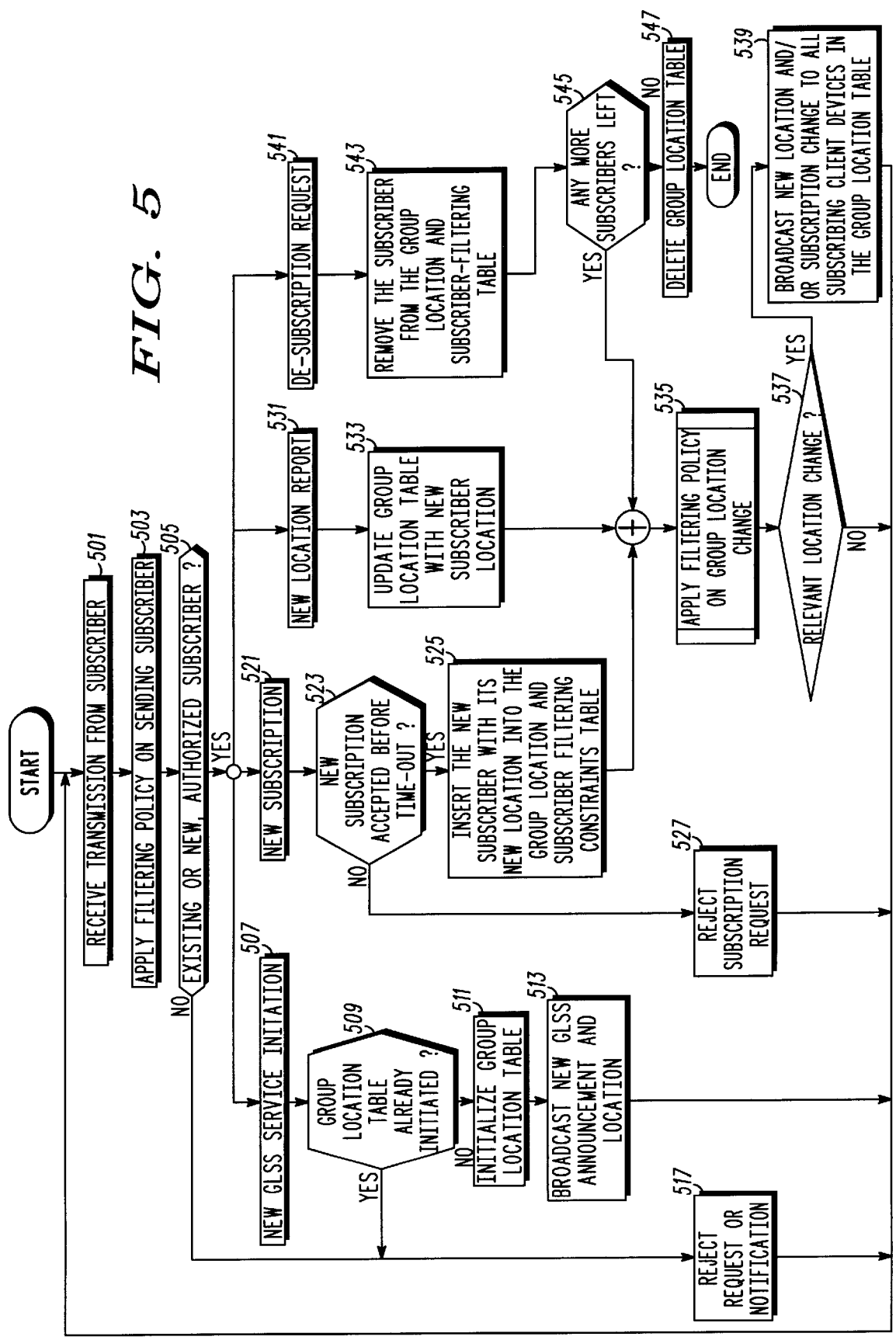

GROUP LOCATION AND ROUTE SHARING SYSTEM FOR COMMUNICATION UNITS IN A TRUNKED COMMUNICATION SYSTEM

FIELD OF THE INVENTION

The present invention relates generally to trunked communication systems and, in particular, to a group location and route sharing service for communication units in a trunked communication system.

BACKGROUND OF THE INVENTION

Trunked communication systems are known to include a wireless infrastructure and a plurality of communication units, such as mobile or portable two-way radios or mobile data terminals. Some communication systems, such as those used for public safety, also include a dispatch console and a so-called "computer aided dispatch (CAD) system" that includes a display-based terminal to control communications between the communication units. The CAD terminal typically displays categorized tables of information to the terminal user (typically referred to as a "dispatcher" or "dispatch operator"). For example, the CAD terminal may display queues of currently pending incidents and/or a list of communication units that are currently available. In addition, some CAD terminals include an integrated mapping program that enables the CAD terminal to display locations of communication units on a map that represents a geographic area supported by the dispatch system. The locations of the communication units are typically provided to the CAD system on a periodic basis by an automatic vehicle location (AVL) system that is coupled to the CAD system via a dedicated communication link.

In addition to receiving communication unit location information, the CAD system may also receive incident information from a 911 system that is coupled to the CAD system. For example, the map may display the origination point of a 911 telephone call to the dispatcher as an icon on the map. By viewing communication unit location, communication unit status, and incident location on the map, the dispatcher can determine which communication unit users (e.g., policemen, firemen, paramedics, and so forth) would be in the best situation to respond to the incident. As an incident is attended to by users of the communication units, the status of the communication units associated with such users is updated either manually by the dispatcher or automatically by the CAD system responsive to messaging from the wireless infrastructure. In the latter case, the wireless infrastructure receives status updates over a wireless communication channel from the communication units that are participating in the handling of the incident. Changes in communication unit status are typically indicated to the dispatcher by some type of visual change, such as a color change or icon update, to the participating unit's representation on the map.

A map display, with icons representing the incidents and the communication units with their current status, gives a dispatcher a useful tool for evaluating an emergency situation. By using standard graphical user interface (GUI) cursor interaction (e.g., point and click or drag and drop), the dispatcher can manipulate the screen icons to assign units to incidents. Thereafter, the dispatcher may communicate information to the assigned units such as, for example, the incident location and other details. As one may appreciate, such systems place a heavy burden upon the dispatch operator, particularly where events and details are rapidly changing. It is possible that a dispatcher might assign units to an incident that are not in the best position to respond or conversely, fail to assign units that otherwise would wish to respond or at least monitor the event. Perhaps even more problematic is the difficulty in determining the type, extent and timing of information to be provided to the assigned units. The problem is exacerbated when one considers that certain units may wish to change their level of participation as the incident progresses.

For example, consider a police chase scenario involving multiple police cars pursuing a fleeing vehicle. It would be desirable for all of the pursuing police cars to receive real time location and/or route information to determine what they each will do to help stop the wanted vehicle. In most instances, the police chase scenario relies upon the lead car broadcasting cross-street references directly to the other assisting vehicles or to the dispatch center for re-broadcast. The dispatch operator is burdened with determining which of the field units are involved in the event, relaying the cross-street references and team member location information to the team. However, this verbal method is prone to errors and it distracts the lead unit from the primary task of the high-speed chase. In addition, the lead car or assisting cars may not really know what other units are assisting in the chase and where they are. Knowing the total "team" of assisting units and where they are, what routes they have followed and what routes they are planning to follow can help determine a chase strategy.

Even if the team member location could be conveyed correctly from the dispatcher to all participating vehicles, the comprehension of the spatial relations of these vehicle locations to other important and relevant events, temporary and potentially moving objects may be severely impaired if not completely impossible. Such temporal objects could include injured persons, pockets of activities of accidents and violence, etc. On the other hand, the continuous transmission of location information to a remote site where it may be displayed also in non-emergency situations may pose an additional problem of the perceived intrusion of work-place privacy or even a security risk. As one can imagine, the current location methods are very error-prone, untimely, limited both in the completeness of location information to be conveyed and in the desired access control.

Current methods are also are deficient in terms of route information, such as the visualization of the spatial context of traversed trajectories, planned routes of the work-team members and the moving objects related to an event. Route information (e.g., knowing which routes are to be followed, or which routes have already been visited by other responding vehicles) and the timeliness of the route information is also important, particularly in assignments where territorial coverage optimization is needed or desired. Examples of such missions are neighborhood-patrolling, search for persons and/or for objects, public works for snow removal, road inspections, utility readings, delivery drop-off/pick-up routes, on-demand car-pooling, etc. Particularly for larger work groups, up-to-date route information would have been impossible to convey only verbally, especially when the routes are changing based on real-time events. In real life situations, a compounded problem is the need for a real-time, on-going optimization of the set of routes for all group members as a whole, which makes the use of a verbal only communication with no visualization support even less effective.

Accordingly, there is a need for a group location and/or route sharing service whereby participating communication units share location and/or route information for a particular event. It would be desirable for field units themselves, or a third party on behalf of the field units, to subscribe for participation in an event based on the communication units' ability or desire to respond. Advantageously, the subscribing units may comprise a talkgroup or subset of a talkgroup assigned to an event. There is further a need for such a group location and/or route sharing service to provide for different levels of participation and/or service levels for the subscribing units. The service levels may include, for example, an information transmission service level and information reception service level that determine an amount, type, and/or timing of information to be sent or received by particular subscribers. The present invention is directed to addressing or at least partially addressing these needs.

SUMMARY OF THE INVENTION

According to one embodiment of the present invention, there is provided a method for a communication unit engaged in a group dispatch voice call to participate in a location sharing service. The communication unit receives a message initiating a location sharing service associated with an event. Responsive to receiving the message, the communication unit, or a third party (e.g., controller) on behalf of the communication unit, subscribes to the location sharing service so as to receive location information associated with the event. Optionally, the communication unit may send location information associated with the event. The location information may comprise, for example, the location of the communication unit and/or the location of an incident the resolution of which requires the location sharing service.

According to another embodiment of the present invention, there is provided a method for groups of communication units engaged in dispatch voice calls to participate in a location sharing service according to different service levels. A group of communication units, such as a talkgroup or subset of a talkgroup, subscribes to the location sharing service, yielding a plurality of subscriptions. The subscriptions are associated with respective service levels which are based, for example, on the amount or type of information to be transmitted or received by the various subscribers. Thereafter, location information is exchanged between the subscribers based on the service levels. The service levels may be based on the level of participation of the subscribers for a particular event, for example, active units or monitoring units. The location information may also be exchanged in response to triggering events such as, for example, change(s) in location or speed, expiration of a time period since the last location information exchange, deviations in route or travel time of certain subscriber(s), or upon certain subscriber(s) entering or being within a particular geographic reference area.

According to still another embodiment of the present invention, there is provided a method for communication units engaged in a group dispatch call that are distributed among a plurality of locations to participate in a location sharing service, whereby the communication units are eligible for movement causing changes in the plurality of locations. The method comprises a first communication unit sending a message initiating a group location sharing service to one or more receiving communication units. The receiving units or a subset of the receiving units subscribe to the location sharing service, forming a group of participating units. Thereafter, a first plurality of the participating units receive periodic location update information associated with a second plurality of the participating units.

According to yet another embodiment of the present invention, there is provided a wireless communication unit operable to participate in a location sharing service. The communication unit includes a radio frequency transceiver, operable to send and receive messages initiating an event-based location sharing service; a selection element enabling an operator to selectively subscribe to the event-based location sharing service, thereby enabling the radio frequency transceiver to receive location information associated with an event; and an operator interface for communicating at least a portion of the location information to the operator.

BRIEF DESCRIPTION OF THE DRAWINGS

FIG. 5 is a flowchart illustrating steps performed by a GLSS controller to implement a group location sharing service;

DETAILED DESCRIPTION OF PREFERRED EMBODIMENTS

Figure 1:
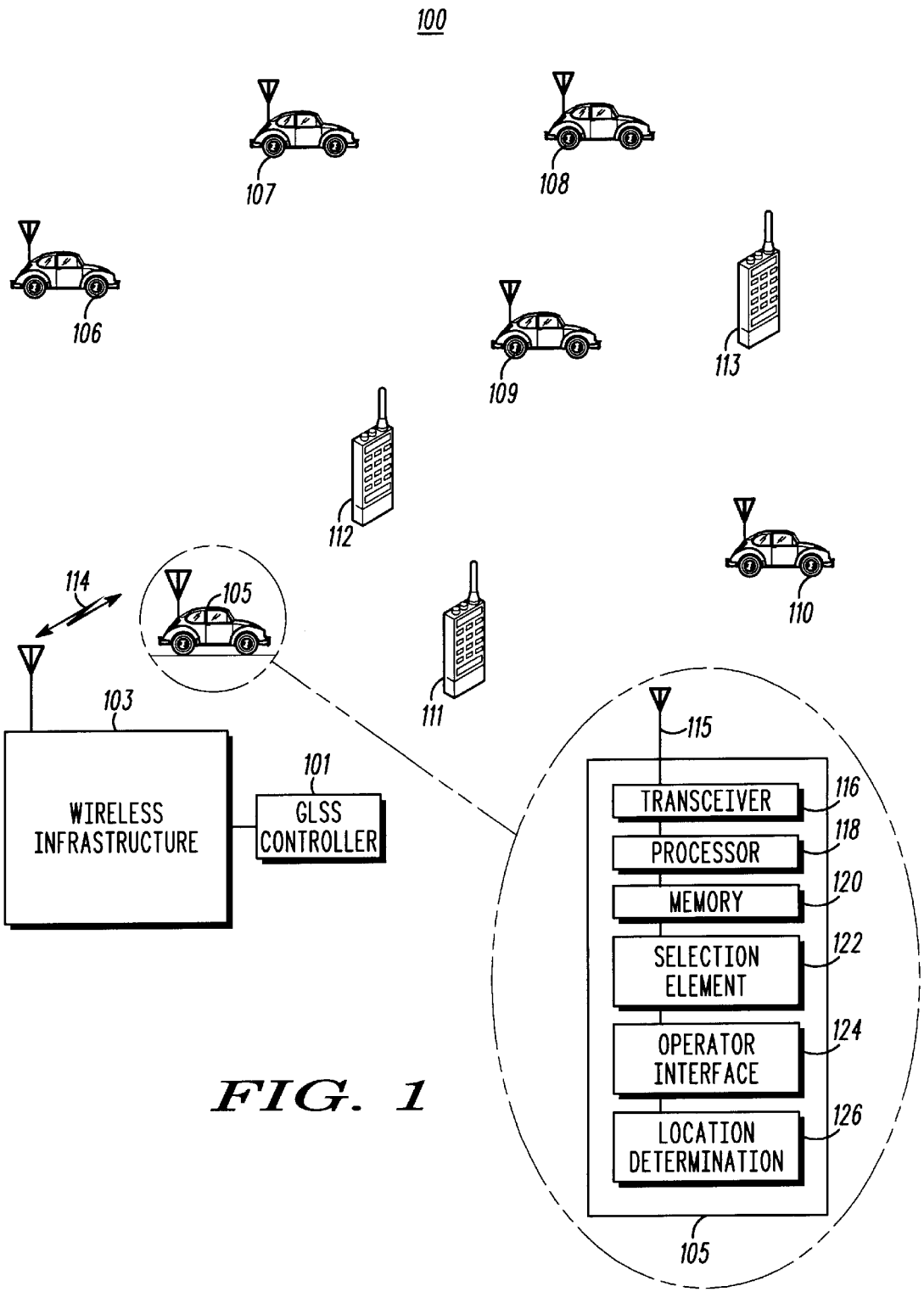
FIG. 1 illustrates a block diagram of a communication system in accordance with one embodiment of the present invention.

Turning now to the drawings and referring initially to FIG. 1, there is shown a block diagram of a communication system 100 in accordance with the present invention. The communication system 100 includes a plurality of communication units 105–113 that communicate with a wireless infrastructure 103 and/or each other over one or more communication resources 114 (one shown). The communication system 100 may be either a conventional system or a trunked system and each communication resource 114 may comprise a frequency carrier, one or more time slots of a frequency carrier, or an orthogonal code implemented by a respective frequency hopping pattern or by a pseudo-random noise sequence spread over a wide bandwidth (e.g., 3 MHz).

The communication units 105–113 comprise two-way mobile radios, two-way portable radios, or two-way wireless data terminals. The wireless infrastructure 103 supports the particular communication system 100 and, therefore, comprises one or more base stations (e.g., in a conventional system) or one or more base stations and one or more system controllers (e.g., in a trunking system). Typically, the wireless infrastructure 103 also includes one or more dispatch consoles comprising fixed computer-aided dispatch (CAD) terminals, which may be coupled to an automated vehicle location (AVL) system and an emergency 911 system (not shown). The AVL system and the 911 system are well known; thus, no further discussion of them will be presented except to facilitate an understanding of the present invention.

The wireless infrastructure 103 includes or is coupled to a group location sharing service (GLSS) server or controller 101. As will be described in greater detail hereinafter, the GLSS controller 101 is adapted to coordinate and manage group location sharing service(s) between participating communication units and/or infrastructure devices. As will be appreciated, the GLSS controller 101 is a functional element that may reside in one or more physical devices. For example, the GLSS controller may reside within a personal computer or functional equivalent, a dispatch console or server, the AVL system or 911 system or, in a trunking system, may reside within one or more system controllers. Alternatively or additionally, the GLSS controller may be distributed among the various communication units 105–113.

As depicted in FIG. 1 in block view (only communication unit 105 shown), the communication units 105–113 include an antenna 115, radio transceiver 116, processor 118, memory 120, selection element 122, operator interface 124 and location determination element 126. As will be appreciated, the various elements are functional elements that may reside in one or more physical devices and, in some implementations, may be operated remotely from the vehicle associated with the communication unit 105. For example, ergonomic efficiency may be realized by incorporating some or all of the elements into a mobile or portable dispatch radio or phone that may be operated inside or outside of a vehicle.

The radio transceiver 116 is coupled to the processor 118 and antenna 115 to enable the communication unit 105 to exchange information (e.g., voice, video, data, text, etc.) with the wireless infrastructure 103 and/or other communication units via an RF channel (i.e., communication resource 114). In the preferred embodiment, the transceiver 116 is used to exchange messages with the GLSS controller 101 to initiate and/or subscribe to a location sharing service and, for those communications units having initiated or subscribed to the location sharing service (hereinafter, "subscribers" or "subscriber units"), to send location information to or receive location information from the GLSS controller 101. In the former case, the location information (or a portion thereof) may be forwarded from the GLSS controller to various subscribers whereas in the latter case, the location information may have been received by the GLSS controller from various subscribers. Alternatively or additionally, the transceiver 116 may be used to exchange messages and/or location information directly with other communication units.

The processor 118 comprises a microprocessor and a digital signal processor for controlling the various elements of the communication unit 105 and for communicating with the wireless infrastructure 103. The memory 120 comprises a random access memory (RAM), read only memory (ROM), programmable read only memory (PROM), and/or a floppy disk to store software algorithms and data, such as communication information, used by the processor 118 during operation of the communication unit 105. The processor 118 and memory 120 enable computational processing necessary for executing wireless transmissions, and communication services such as two-way radio voice communication services, including dispatch or talkgroup call services. The processor and memory also enable execution of location or route sharing services, separately or in combination with the talkgroup call services. The processor and memory further enable certain location-based data applications such as, for example, map-based location tracking and routing applications that track the location and manage the route of the communication unit 105.

The selection element 122 comprises a user input device such as, for example, a push-to-talk (PTT) activator or push button of a mobile or portable dispatch radio/phone, foot switch, panel microphone, computer mouse or equivalent (e.g., trackball or touchpad), keyboard or touchscreen, voice activated device, voice recognition device, or some combination thereof to enable the operator of the communication unit 105 to initiate a location sharing service or subscribe to an already-initiated service. That is, the operator uses the selection element 122 to express a desire to initiate or subscribe to the location sharing service, which desire is communicated, via the transceiver 116 and wireless infrastructure, to the GLSS controller 101. The selection element may similarly be used by the operator to de-subscribe to the location sharing service.

Figure 2:
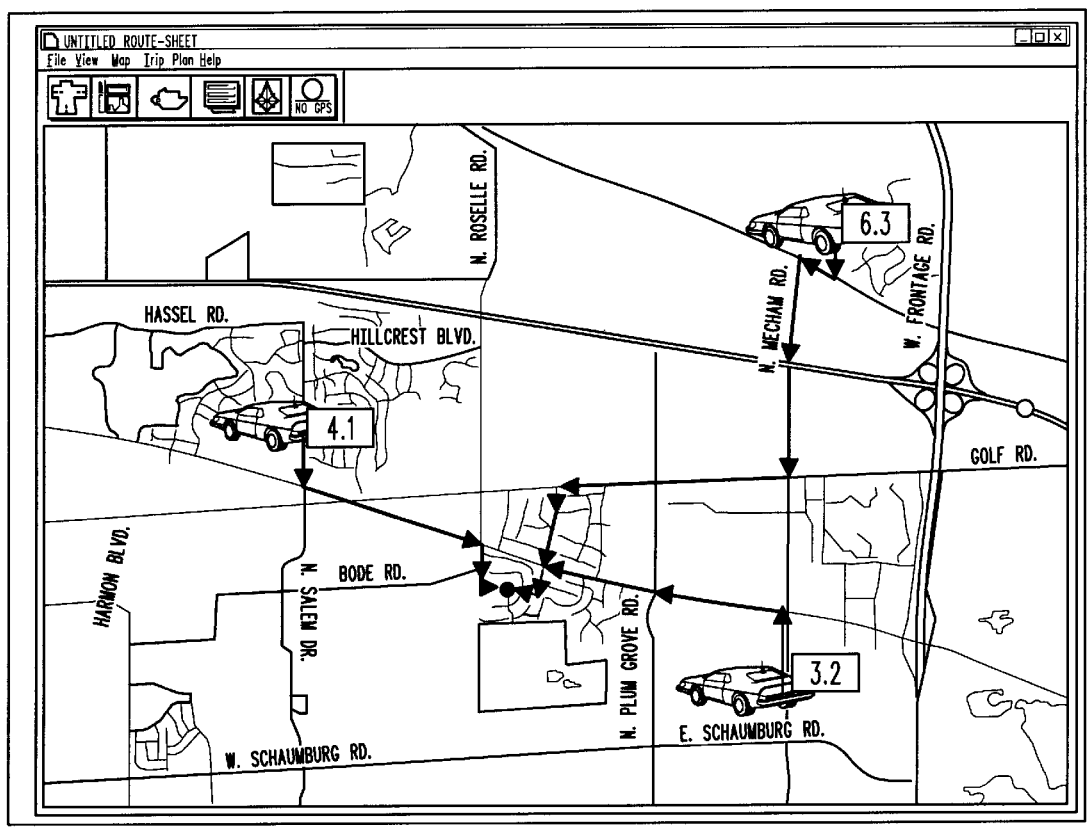
FIG. 2 illustrates an exemplary map displayed to a user of a communication unit.

The operator interface 124 comprises an input device, incorporating (or separate from) the selection element 122, that permits a user to input information other than initiation of or subscription to a location sharing service for transmission to one or more of the communication units 105–113 or the wireless infrastructure 103; and output device such as a display having speaker(s) for communicating voice, video and/or data to the operator of the communication unit 105. In the preferred embodiment, the operator interface 124 comprises a display window adapted for displaying location information, such as a map including street information, landmarks, locations and/or status of communication units 105–113 in a particular geographic area. An example of such a display is shown at FIG. 2. Alternatively or additionally, text messages, graphical icons or synthesized voice may be employed to communicate location information to the user. In either case, the location information is adapted for periodic updates through exchanges of information with the GLSS controller 101.

The location determination element 126 comprises a location sensor and associated hardware and software for determining the location of the communication unit 105. Typically, the location determination is performed by an in-vehicle navigation unit, utilizing a Global Positioning System (GPS) receiver connected to a GPS antenna. The navigation unit and the rest of the communication unit 105 (e.g., mobile dispatch phone) are connected through a serial connection. Alternatively, the two devices have wireless connection, such as BlueTooth, that would enable the use of the phone outside of the vehicle for other purposes, as well. This connection is used for sharing location data between the navigation device and the mobile phone. Alternatively or additionally, assisted GPS, time-of-arrival, enhanced time-of-arrival, dead-reckoning sensors or any other suitable technology that enables the location determination element 126 to accurately determine the location of the communication unit 105 may be used. Examples of commercially available brands of in-vehicle navigation units include Garmin and Alpine. In any case, the resulting location is communicated via the transceiver 116 to the GLSS controller 101 where it may be forwarded to other participating subscribers 106–110 and/or infrastructure devices. In addition, the location information may be used to filter and interpret the location information received from other subscribers.

FIG. 2 shows an example map display that may be provided to a user of a communication unit according to principles of the present invention. The map display shows three public safety vehicles approaching an incident location, as well as the planned routes and estimated time of arrival (ETA) of the vehicles. As shown, the current location of the vehicles is represented by respective vehicle icons, the incident location is depicted by a "dot" in the lower middle of the display, the planned routes are depicted by arrows leading to the incident location and the ETAs (i.e., 4.1, 6.3 and 3.2 minutes, respectively) are shown in small windows attached to the vehicle icons. Preferably, all of this information is updated in real-time (e.g., every 10 seconds or less) as the vehicles change their location, ETA, planned or actual route, etc. The map display may also be augmented by an additional speech interface and/or light and sound effects. It is contemplated that such augmented human interface may assist in reducing driver distraction, which could be especially critical if the driver is the only person in the vehicle. The additional speech interface, if provided, could be used to produce a pre-recorded and/or synthesized voice announcement of major changes in the location of any of the vehicles and to specify/change the conditions when such announcement is required. For example, the announcement could be given if and when any of the vehicles pass a major intersection, if the distance between vehicle(s) or the distance between certain vehicle(s) and the incident location reaches a certain threshold, if any of the vehicles change routes, etc.

Figure 3:
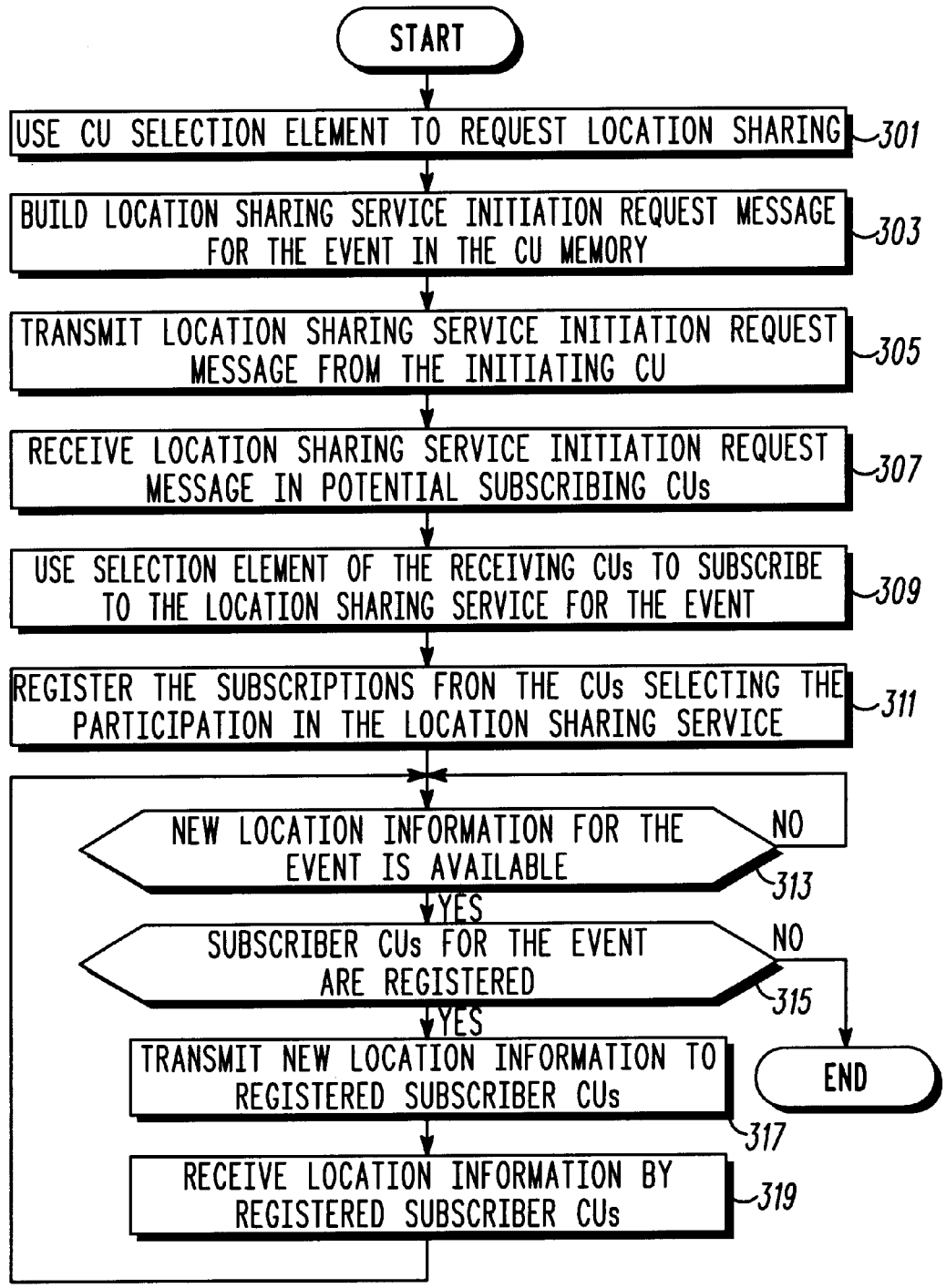
FIG. 3 is a flowchart illustrating a high-level location sharing service algorithm according to the present invention.

Now turning to FIG. 3, there is shown a high-level flowchart of various steps in implementing a group location sharing service (GLSS) between communication units. For convenience, the steps of FIG. 3 will be described with reference to the communication units 105–113 shown in FIG. 1, where it is presumed that the communication units are already engaged in a group dispatch (i.e., talkgroup) call and the operator of communication unit 105 detects an accident, a crime scene or the like for which the coordinated effort of the operators of communication units 106–113, or a subset of communication units 106–113 is desired. The steps of implementing a talkgroup call are well known in the art and are not described herein except as they pertain to establishing a GLSS service supplementary to the talkgroup call.

At step 301, a service initiator (e.g., the operator of communication unit 105) requests location sharing for a particular event, thereby initiating the GLSS. In the preferred embodiment, initiation of the GLSS is accomplished by the service initiator through the selection element 122 (e.g., pressing an appropriate button, etc.) and may be accompanied by a voice communication from the service initiator. For instance, in the present example, where communication unit 105 is engaged in a talkgroup call, the operator of communication unit 105 may initiate the GLSS by using a special keypad combination while pressing on the push-to-talk (PTT) button of the communication 105. As in an ordinary group voice call service after pressing the PTT button, the voice channel assigned to the talkgroup will be acquired for a voice transmission from the operator of communication unit 105. The acquired voice channel may be used by the operator of communication unit 105 to announce the reason he or she desires to start the GLSS.

At step 303, responsive to the initiation request at step 301, the initiating communication unit builds GLSS initiation request message(s) and stores the message(s) in memory. At step 305, the initiating communication unit sends the GLSS initiation request message(s) to the GLSS controller 101. The GLSS initiation request message(s) identify the initiating device (e.g., communication unit 105) and, of course, the desire of the initiating device to initiate the GLSS service. In the preferred embodiment, in the case where subscribers are participating in a talkgroup call, the GLSS initiation request message(s), in addition to accompanying voice messages and/or location information, are sent over the voice channel before it is released. CDPD technology is a good and known implementation example of sending such data over the voice channel mixed in the pauses in the voice signals. Alternatively or additionally, GLSS initiation request messages and/or location information may be sent using a control channel. Other methods of sending subscription and location data as a supplementary information to the group voice call communication include the use of the underlying packet-data transport layers if applicable, or the use of separate, other data transmission supplementary services such as the Short Message Service (SMS).

At step 307, the prospective subscribers (e.g., communication units 106–113) receive GLSS initiation request message(s) from the GLSS controller 101 indicating that the GLSS service has been requested by the service initiator. Then, at step 309, communication units desiring to subscribe to the GLSS service do so by exercising the appropriate selection element(s) 122. For example, communication units 106–113 may subscribe to the service by using a special key-pad combination while pressing on their push-to-talk (PTT) buttons, similarly to the communication unit 105 initiating the GLSS service. Alternatively, subscription to the GLSS service may be accomplished entirely or in part by the GLSS controller or other suitable third party device on behalf of the communication units. As will be appreciated, fewer than all the prospective subscribers may subscribe to the event. Thus, in the present example, only communication units 106–110 might subscribe to the event. In one embodiment, those communication units subscribing to the event generate GLSS subscription request message(s) and send the messages to the GLSS controller 101. Upon granting the subscription(s), the GLSS controller 101 returns subscription grant message(s) to the subscribers and at step 311, the GLSS controller 101 registers the subscribers, or otherwise maintains a list of subscribers that are to participate in the location sharing service.

At step 313, the GLSS controller 101 determines whether new location information is available for the declared event (e.g., accident, crime scene, etc.). The location information may comprise, for example, periodic location(s) received from subscriber(s) as determined by the appropriate subscribers' location determination elements 126. In one embodiment, the location information is sent from the subscriber(s) to the controller 101 in the form of GLSS announcement parameter block(s) or message(s) constructed by participating subscribers. Alternatively or additionally, the GLSS controller itself may itself construct announcement blocks based on information available to the GLSS controller. In one embodiment, the GLSS announcement blocks (or the information allowing the GLSS controller to construct announcement blocks) are sent in response to certain threshold events, for example, in response to a change in location or speed, or deviations in route or travel time of subscriber(s) exceeding a threshold value, or upon certain subscriber(s) entering or being within a particular geographic area. As will be described in greater detail in relation to FIG. 4, the blocks may be filtered according to filtering policy attributes or service levels of the subscribers or the service controller. Preferably, the block(s) include indicia of the location of at least the service initiator. Optionally, the blocks may also contain the location of other subscribers or additional data, such as the past or intended future trajectory/route of selected subscribers, as will be described in greater detail in relation to FIG. 7.

If location information is available at step 313, the GLSS controller determines at step 315 whether any subscriber(s) are registered for the event. If subscriber(s) are registered, the GLSS controller 101 sends location information to the registered subscribers at step 317 and the subscribers receive the location information at step 319. In one embodiment, the subscribers receive location information in the form of GLSS announcement message(s) from the GLSS controller 101. Upon receiving the announcement messages, the location information embedded therein is communicated to the subscribers via their respective operator interfaces (e.g., map displays, etc.). The process continues as long as new location information is available, until such time as there are no remaining subscribers registered for the event. The subscribers may de-subscribe from the GLSS at any time to discontinue receiving location information associated with the event. Similarly to the act of subscribing to the GLSS, the subscribers may de-subscribe by operator action or alternatively, a service controller or suitable third party may perform the de-subscriptions on behalf of the subscribers. In the former case, the communication unit(s) desiring to de-subscribe generate a GLSS de-subscription request message and send the message to the GLSS controller 101. In the case where the subscribers are members of a talkgroup, the de-subscription request may be embodied in a de-affiliation request for the talkgroup. Upon granting the de-subscription request(s), the GLSS controller de-registers the former subscribers and returns de-subscription acknowledgment message(s), as appropriate.

Figure 4:
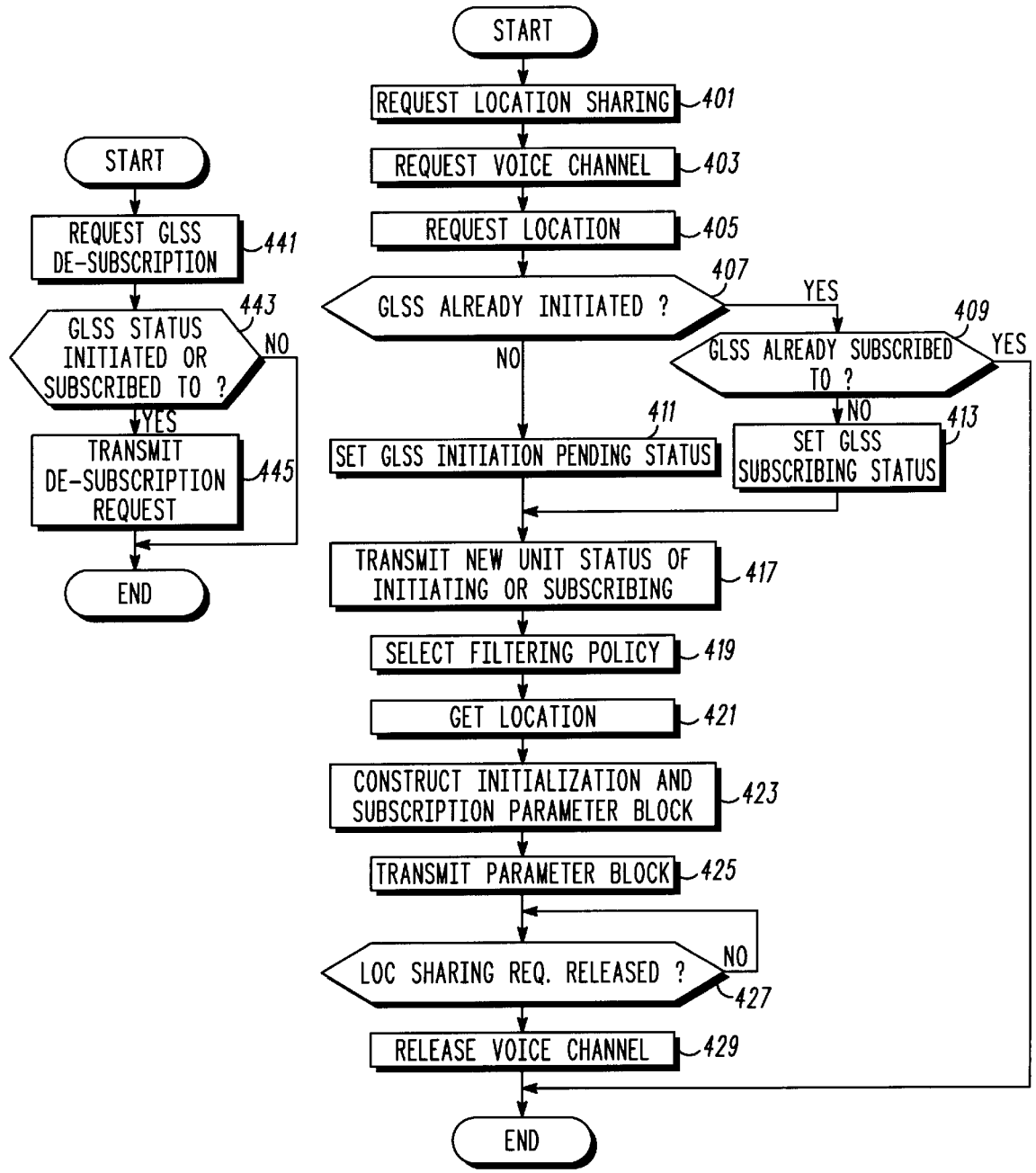
FIG. 4 is a flowchart showing a GLSS client algorithm for processing user input from a group voice call talkgroup member.

Now turning to FIG. 4, there is shown a group location sharing service (GLSS) client algorithm for processing user input from a subscriber engaged in a group voice (i.e., talkgroup) call. The process starts at step 401, when one of these subscribers, the GLSS initiator requests location sharing by manual input on his/her communication unit. As an example, suppose a public safety officer discovers an accident, a crime scene or any other type of incidents requiring the attention and the coordinated effort of some or all of the currently communicating talkgroup members to resolve the incident. This public safety officer may become the initiator of the GLSS request by using a special GLSS button or key pad combination while pressing on the push-to-talk (PTT) button of his/her communication unit. This is interpreted as a request for a voice channel (step 403) and a request for location (step 405).

As in an ordinary group voice call service after pressing the PTT button, the voice channel assigned to the talkgroup will be acquired for a voice transmission from this talkgroup member after it is requested in step 403. The acquired voice channel may be used to transmit an announcement from the GLSS initiator that identifies the reason for starting the GLSS as a supplementary service to the existing group voice call. In addition to transmitting the voice announcement, the "Request Location Sharing" function will also automatically enable the determination of the location of the initiator's subscriber unit as shown in step 405. Compared to the execution speed of the client device CPU, the completion time both for the voice channel acquisition and for the location determination could be significant. The voice channel acquisition time depends on the design of the trunking system and on the traffic on it. If GPS technology is used for location determination, the location determination time depends on the design of the GPS receiver, on the satellite constellation prior to the last successful location reading. In order to allow for such parallel execution of the location determination, the function of requesting location (step 405) is shown separately from the function of actually receiving the location data (step 421).

In one embodiment, in the case where the same GLSS button or keypad combination is used both for initiating the GLSS service and for subscribing to an already-initiated service, the exercise of the GLSS button or keypad combination by a particular device is interpreted by the GLSS controller as a new GLSS request only if such service is not currently active. That is, if such GLSS service has already been initiated and the device has already been notified on the service initiation, the exercise of the button or keypad combination is interpreted as an attempt to subscribe to the already initiated service by this communication unit. The determination of whether the GLSS service has already been initiated is made at step 407 and the determination of whether the GLSS service is already subscribed to is made at step 409. If the GLSS service has already been initiated and this device has already been notified on this service initiation according to the determination of step 407 but this device has not yet subscribed to this GLSS service as determined in step 409, then the "Request Location Sharing" manual function is interpreted as an attempt to subscribe to the already initiated service by this subscriber communication unit and the "Subscribing" status is set in step 413.

The person of ordinary skill in the art will appreciate that this constraint applies to this algorithm because it is designed to support only for single GLSS instances. If more group location sharing service instances were supported simultaneously, this manual function could be effective each time it is applied. The state-machine then would be more complex than here and an additional user interface input would also be required in the subscriber device ergonomics to separate the GLSS service initiation request from the GLSS subscription request. The GLSS subscription request would respond to an already initiated service instance depending on how the subscription selection is defined in the configuration. For example, it could subscribe to the last initiated service or alternatively it would scroll down on all active service instances and select one to subscribe to. In the single-instance GLSS scenario described in this algorithm, if no GLSS has currently been initiated the "GLSS initiation pending" status is set for this device as shown in step 411.

While the voice channel is being acquired and the location is being fetched from the location determination unit, the status of the client device is checked on potential, prior engagement in group location sharing services. If no such GLSS supplementary service is active, a "GLSS Initiation Pending" status is set as shown in step 411. After the voice channel has been acquired, the new device status requesting the initiation of a new GLSS service is transmitted to the network for processing by the GLSS server as shown in step 417. Next, at step 419, a filtering policy or policies are selected according to previously provisioned subscriber preference and device configuration attributes. The filtering policies may define, for example, how often and what type of location information the client should receive from the location determination unit; how often and what type of location information the client should report to the GLSS controller for the purpose of disseminating it to the GLSS subscribers; and, in the case of information to be received by the communication unit, the filtering policy determines how often and what type of location changes and location-specific parameter changes in the mobile group movement should be reported back to the requesting client device from the GLSS controller in the network.

In one embodiment, the filtering policy rule sets are determined off-line, while provisioning the GLSS service in the network and prior to starting new GLSS service instances. At the time of service provisioning, the rule sets can be transmitted by the location determination unit to the mobile dispatch phone and then, from the dispatch phone to the network for network-wide service provisioning purposes. These rule sets can be stored in the network by the GLSS controller and disseminated to other subscribers' location determination elements for provisioning. The location transmission filtering policy rules can specify several types of location transmission constraints, for example, filtering by location proximity, by location change, by elapsed time or any combination of the above.

As will be appreciated, the filtering policy may differ for individual subscribers or groups. In one embodiment, the filtering policy is determined, at least in part, upon service levels associated with subscribers or groups. As will be appreciated, any of several service levels could be employed. For example, service levels may be based on the level of participation of the subscriber (e.g., "monitoring only" or "contributing only"). A "monitoring only" participant does not transmit its own locations but receives all location information transmissions. The "contributing only" participant is the opposite by not receiving any of the location information broadcasts but sending its own location data. The monitored and/or the contributed portion of the location information could also be restricted to certain types of transmissions. For example, all subscribers receive the initiation location information transmission, but some of the "contributing subscribers" will not receive the periodical location updates. Alternatively or additionally, service levels could be determined based on the desires or capabilities of the respective subscribers to send and receive certain information. In one embodiment, an information transmission service level defines an amount, type or timing of information that a subscriber will transmit to the GLSS controller 101 and an information reception service level defines an amount, type or timing of information that a subscriber will receive from the GLSS controller 101. Finally in some provisioning variations, for some subscribers the subscription and/or service levels will not be optional but decided by other, authorized subscribers who may or may not be the GLSS initiators or by network device operators outside of the GLSS instance participation membership. Such decisions on the default subscriptions can be made when setting up a specific subscriber profile, its service preferences or specifically for a GLSS instance, before or after its initiation starts.

After the location of the mobile device is obtained (step 421), the location and selected filtering policy attributes are assembled to construct a GLSS announcement parameter block at step 423. The block is transmitted to the GLSS controller at step 425 for processing in the network, following the previously transmitted request for initiation of the GLSS service. Optionally, this parameter block may also contain additional data, such as the past or intended future trajectory/route of the vehicle where the mobile device resides. After the parameter block is transmitted, the device waits in step 427 for the user completing the service initiation voice announcement and releasing the location sharing request button. The voice channel can be released only after the mobile group voice call device user has completed the voice transmission and has released the PTT button. The voice channel is released in step 429.

In some, exceptional cases, the release of the PTT button occurs much sooner than the completion of the location determination function, although this case is not shown in FIG. 4. This may happen if the GPS device has to wait for seconds or occasionally, for minutes for locking on the positioning satellite constellation. This typically happens when the GPS receiver has only recently been turned on and applicable, active satellite constellation was not stored in the GPS device. This could cause especially long delays if the last active location where the device was used was at a large enough distance from the current location with a completely different satellite constellation information. In these cases, the client algorithm does not wait for the completion of the location determination. Instead, a special attribute flag is set in the transmitted initial parameter block indicating that the location data is still being acquired. The location determination module may substitute the live GPS-satellite position derived location with estimated, approximate location with indicating the source of the estimation with the extent of the error window size in the parameter block. The implementation of such substitute estimates is internal to the location determination module. Alternatively and depending on the provisioning parameters of the GLSS location sharing service, the initiation of the GLSS is denied by the client algorithm if no reliable and accurate enough location information is available. The person of ordinary skill in the art will appreciate the use of several time-out provisioning alternatives to determine how long to wait for the completion of the location determination function in relation to various, related events. The latter events may include the construction of the parameter block in step 423. The service provisioning parameters might allow for the subscriber to participate in the GLSS group location sharing service without actually transmitting its own location data that would meet certain thresholds in accuracy and confidence levels after such time-out condition applies. On FIG. 8, such time-out value would be illustrated as the distance between the 405 "Request Location" signal and the 421 "Receive Location" signal, in case the 802 location determination function is not ready yet to supply the accurate location data at the time of receiving the 421 "Get Location" signal.

In one embodiment, the Request Location Sharing service initiation request and the additional parameter block are sent over the voice channel before it is released in step 429. The CDPD technology is a good and known implementation example of sending such data over the voice channel mixed in the pauses in the voice signals. The person of ordinary skill in the art will appreciate this same method with using the control channel for transmission of the GLSS control signals, the associated parameter blocks and other location and location-related data. Other methods of sending subscription and location data as a supplementary information to the group voice call communication include the use of the underlying packet-data transport layers if applicable, or the use of separate, other data transmission supplementary services such as the Short Message Service (SMS).

After the Request Location Sharing service initiation signal and associated parameter block with location data is sent to the network in step 425, the GLSS client algorithms waits for a notification to receive back from the GLSS server control algorithm in the network. As shown on FIG. 8, this will happen when the GLSS server controller broadcasts the service initiation in step 513 at the same time to all potential subscribers and back to the originating service initiator.

In one embodiment, subscribers to the group location sharing service can de-subscribe at any time by requesting a GLSS de-subscription at step 441. This may be accomplished, for example, by depressing a particular "Request GLSS_Desubscribe" button or keypad combination. Then, it is determined at step 443 whether the GLSS is initiated or subscribed to (similar to steps 407, 409 in response to the location sharing request 401). In such case, a de-subscription control signal is sent to the GLSS controller at step 445. Alternatively, the same PTT button combination could be used as a toggle button both for subscribing and for de-subscribing to the location sharing service, but such implementation would prevent the use for multiple GLSS instances. There could also be a voice transmission accompanying the de-subscription request if required by a provisioning parameter.

FIG. 5 shows steps performed by a GLSS controller to implement a group location sharing service. At step 501, the GLSS controller receives a transmission from a subscriber. The transmission may comprise a GLSS service initiation, new subscription to an already initiated service, a new location report from a GLSS subscriber or a de-subscription request. In either case, the controller first validates the sending subscriber unit (i.e., determines the eligibility of the subscriber unit to participate in the GLSS) by applying filtering policy(s) at step 503. For example, filtering policy(s) could be used to limit the participation in a location sharing service within certain talkgroups only to certain areas enclosed within certain geographic boundaries. Such filtering policy(s) could be enabled or changed by a dispatch control center of the wireless infrastructure 103 (FIG. 1). Exclusion of certain subscriber units may also be requested in the dispatch control center or by other, specific subscribers who are authorized to perform such excess permission updates.

Next, at step 505, the controller performs an authorization check to determine if the subscriber is an existing or new subscriber. If the transmission is a new GLSS service initiation request or a subscription to an existing GLSS service, the provisioning parameters are checked for the sending unit to verify if the subscriber is authorized to use the supplementary GLSS location sharing service. If the authorization fails, the request is rejected by sending rejection response back to the requesting mobile unit in step 517. Note that such provisioning authorization check is performed only once per each subscriber in relation to a specific GLSS group location sharing service. After the authorization is successfully conformed, all subsequent notifications and update requests from this subscriber unit are accepted without checking the provisioned authorization parameters. If the authorization succeeds at step 505, the controller determines the request type. For a new subscriber, it is either a GLSS server initiation request (block 507) or a new subscription (block 521) to an already existing GLSS service. For an existing subscriber, it may be a new location report (block 531) or a de-subscription request (block 541).

In the case where the transmission is a GLSS service initiation request (block 507), the main role of the GLSS controller is to rebroadcast the new GLSS service initiation request to potential subscribers to this new service. At step 509, the controller determines whether a group location table is already initiated. If not, the controller creates and initializes a new group location table at step 511 to support the new service instance. If a group location table already exists for the new service, for example, in the instance where another subscriber had already requested a GLSS service initiation prior to the arrival of the new initiation request, then the new GLSS service initiation request is rejected at step 517 by sending a rejection response to the requesting communication unit wound. Otherwise, the group location table initialization is completed and, at step 513, a GLSS announcement is broadcast to all potential subscribers.

In one embodiment, the GLSS announcement includes the initiator communication unit's intent to start a new GLSS service and its location. The GLSS announcement block may also specify constraints on accepting subscriptions by determining a subscription time-window value, a maximum GLSS group size and/or an authorization condition. Examples of authorization constraints may include exclusion of subscriber vehicles on training missions while resolving critical real-life incidents, or an EMS might have responded when no medical emergency was involved in the incident. The set of potential subscribers may include all talk-group-members that are currently engaged in a group voice call service with the GLSS service initiator. Alternatively, the set may include all potential talk-group members of the initiator, regardless the membership and/or actual participation in the currently active group voice call service. Finally, dedicated group memberships may be declared for the GLSS service at the time of provisioning this service. The criteria for selecting one of the above policies for determining the set of GLSS subscriber candidates are themselves declared for the GLSS service at the time of provisioning this service.

The broadcast of the GLSS announcement in step 513 may have reached subscribers the relevance of who could not be established at the time of the broadcast. For example, the GLSS service may have been provisioned to broadcast to everyone with access to the control channel, or to everyone who was configured in the same talk-group with the GLSS service initiator subscriber. Such broadcast may have been configured for simplicity. For example, this eliminates the need for constant tracking of the attributes and the relevant status of all potential subscribers. As a result, the broadcast may have reached subscribers that have no potential role in resolving the incident, which is the subject of the announced and initiated GLSS service. For example, a police vehicle too far away from the incident responded while the GLSS service control algorithm had no information on its location prior to sending out the broadcast announcement in step 513. If the received service initiation notification transmission originates from an irrelevant initiator subscriber, it is discarded in step 517 and the GLSS control algorithm loops back to waiting for the receipt of a new transmission.

In the case where the transmission is an otherwise valid new subscription request (block 521) to join an already existing GLSS service, the subscription may be accepted (or rejected) based on time-window constraints. As shown, the controller determines at step 523 whether the request is received before a time-out period has expired. If not, the subscription request is rejected at step 527. Otherwise, the subscription request is accepted. At step 525, accepted new subscriptions are placed in the group location table and in the subscriber filtering constraint registry. The latter will specify what subsequent location updates from other subscribers will require forwarding to the newly registered subscriber.

At step 535, another filtering step is performed to determine which existing subscriber unit(s) will be notified of the new subscriber registration based on the location, attributes, status and instant subscription preferences of the new subscriber and the already subscribed units. New subscriptions are broadcast in step 539 to all subscribers in the group location table.

In the case where the transmission is a new location report (block 531) from a subscriber, the controller will use the filtering policies of step 503 in order to qualify each location update received from the initiator subscriber unit, whether it is relevant to the rest of the group or not. In one embodiment, the filtering policies are captured in the announcement parameter block that is broadcast at step 513. If the new location report is accepted, the group location table is updated at step 533 to reflect the new location report. Then, at step 535, another filtering step is performed to determine, if the received location update is relevant for reporting to none, any or all of the existing GLSS subscribers. If (decision 537) it is not relevant to any of the subscribers, the algorithm loops back to waiting for a new transmission from subscribers. Otherwise, the location change is broadcast in step 539 to all subscribers or only to those who were marked as relevant by the filtering policy check.

In the case where the transmission is de-subscription request block (block 541), the controller removes at step 543 the subscriber from the group location and subscriber filtering table. If there are remaining subscribers, determined at step 545, the process proceeds to step 535. Otherwise, if the service initiator and all subscribers have de-subscribed, the controller deletes the group location table at step 547 and the GLSS terminates.

Figure 6A:
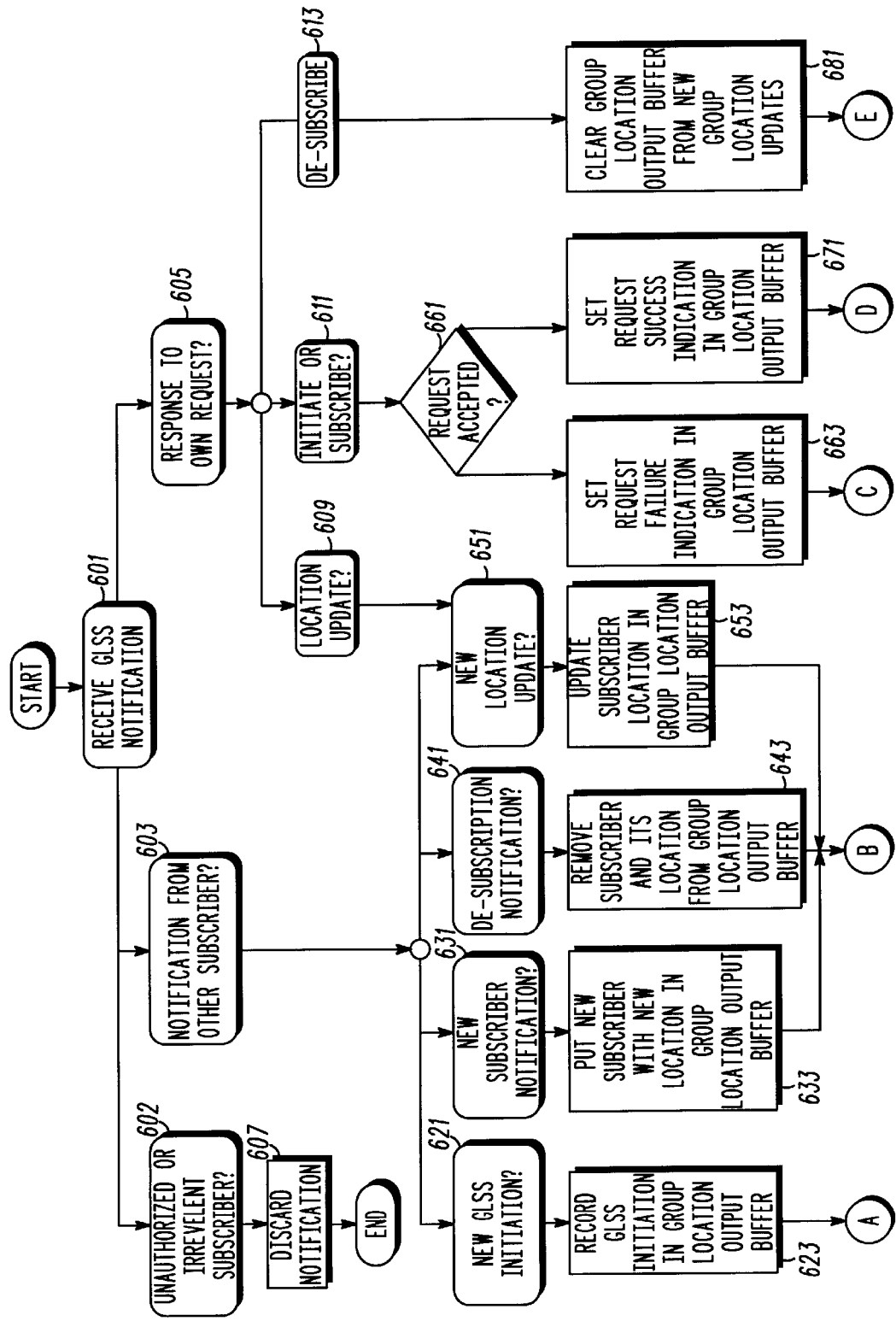
FIG. 6 is a flowchart showing a client algorithm for processing GLSS update notifications from a GLSS controller.
Figure 6B:
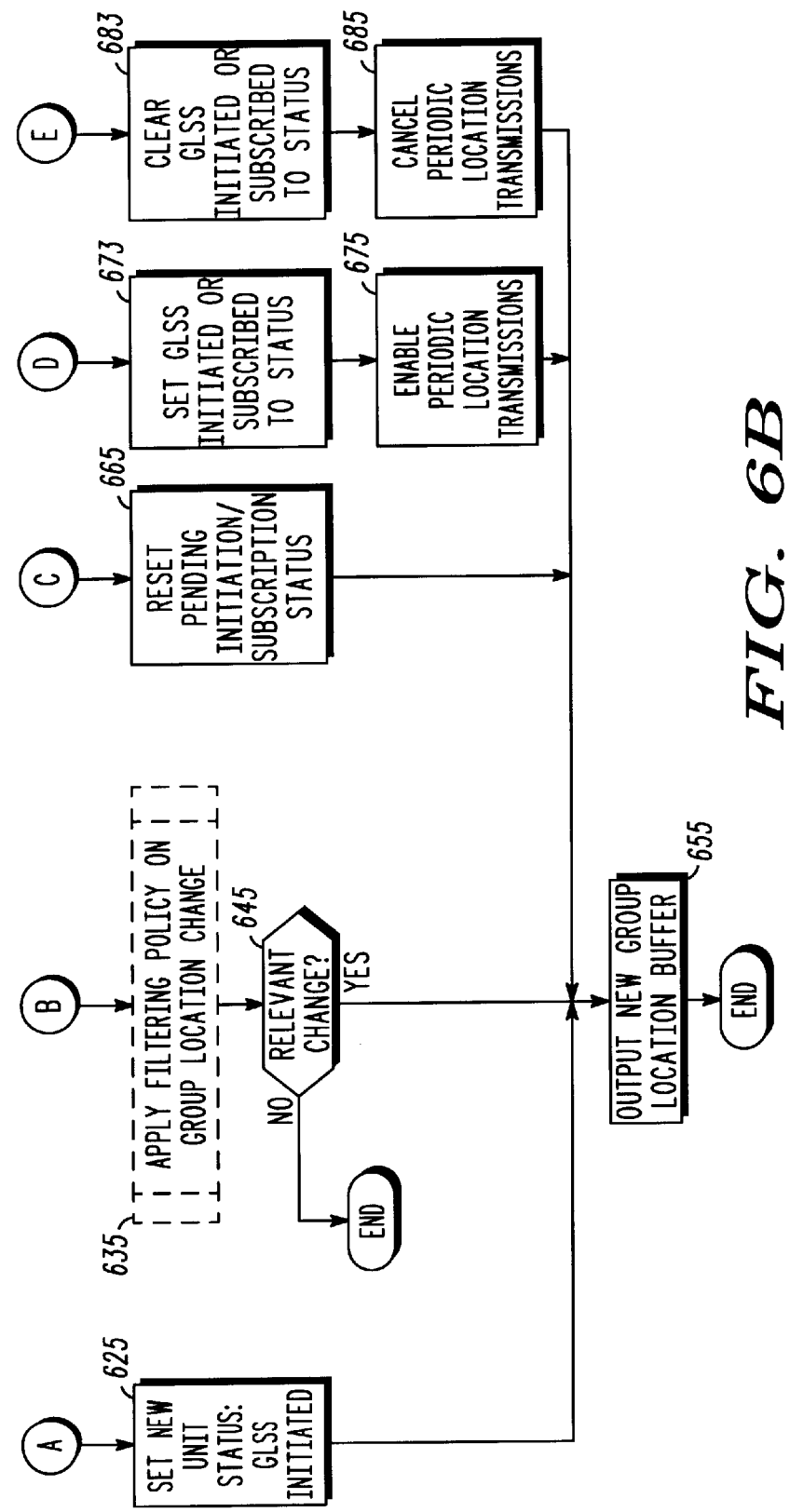

Now turning to FIG. 6, there is shown a client algorithm for processing GLSS update notifications from a GLSS controller according to one embodiment of the present invention. The process begins at step 601, when a subscriber receives a GLSS notification. The notification may be from another subscriber (block 603) or may be a response to the receiving subscriber's request (block 605).

At step 602, the receiving subscriber determines if the received service initiation notification originates from an authorized and relevant subscriber. In order to determine this, a predetermined filtering policy is applied, which is customized to this particular receiving subscriber for validating notification report sources. The filtering policy for a particular receiving subscriber may exclude an originating subscriber based on specific attributes and/or location of the originating subscriber, or based on attributes and/or relative location of the receiver. For example, in the case where the receiver is an EMS (Emergency Medical Service) vehicle, it may accept notifications from public safety, firefighter or other EMS vehicles but not from road maintenance vehicles. As another example, the EMS vehicle may filter out notifications from subscriber(s) having location(s) that are too far away such that they should no burden the load on the subscriber unit equipment and/or the user either, regardless the type of the notification. That is, the EMS vehicle may filter out notifications, even from other EMS vehicle(s) if those vehicles are beyond a certain distance threshold. As still another example, a receiver may accept location updates or new subscriptions from other types of vehicles if they already subscribe to the same location sharing service but may not respond to new service initiation requests from those types of vehicles. As a result, the algorithm discards such initiation request notifications in step 607, whether the server control algorithm discarded such initiation request notifications or not. Note that in the embodiment illustrated on FIG. 5, only subscription request rebroadcasts of step 539 are filtered in step 535 of the server control algorithm but all service initiation requests are made available to all potential subscribers in step 513 for consideration.

If the notification is from another subscriber (block 603), and the subscriber is authorized (step 602), then the type of notification is checked. The type of notification may comprise a new GLSS service initiation (block 621), new subscriber notification (block 631), de-subscription notification (block 641) or new location update (block 651).

In the case of a new GLSS service initiation, the GLSS service initiation is recorded at step 623 in the group location output buffer and, at step 625, a new "GLSS Initiated" status is set for the receiving unit. Then, at step 655, the GLSS initiation is communicated to the user of the subscriber unit through its output device. Depending on the subscriber device and on the GLSS/group voice call service provisioning and preference parameters, this can be accomplished by a speech announcement, special sound and/or light effects, appearance of special, new icons on the map-display of the embedded device or by a combination of the above. In one embodiment, when the service initiation notification is received, the receiving subscriber unit also receives location information associated with the "Request Location Sharing" signal. Using this location data, for example, the receiving client user may see its own location coordinates, and/or the location coordinates of the service initiator as flashing icon(s) on a dot-on-the-map style digitized road-map display. The location information (and hence the map display) may also include the location of the incident or event giving rise to the GLSS service. Alternatively or additionally, it is contemplated that the received location data may be communicated to the receiving client using synthesized speech, text, image data or generally any other type of data that will facilitate or enhance the GLSS service. For example, speech or text-based location data can relate the received location to street intersection identified by a pair of street names, street addresses, distances and directions relative to the location of the receiving client (for example, "1.5 miles North of you on Main road"), to the location of points of interest (for example, "two blocks west of the city water tower") or to the location of intersections (for example, "One block South the intersection of Main with Hubbard") or street addresses (for example, "Approaching 216 W Main Street"). As another example, in a wide-band network, a photo-image of depicting some typical scenario or aspect of the reported incident can also be received by the potential subscriber device and displayed on the LCD of that device.

In the case of a new subscriber notification (block 631), the new unit is inserted in the group location output buffer in step 633. Optionally, before outputting the new subscriber and its location to the receiving subscriber unit user in step 655, the notification is filtered at step 635 according to a predetermined filtering policy, so as to reduce burdens on the receiving subscriber equipment and/or the individual user. Generally, the filtering policy eliminates (or "filters out") subscriber notifications that are not relevant to the receiver. The notifications are determined to be relevant (or not) at step 645. The filtering policy is indicated as optional in FIG. 6 because the filtering policy rules may be more bandwidth efficient to utilize in the GLSS controller rather than by receiving subscriber(s). However, step 635 contemplates that receiving subscriber(s), alternatively or additionally to the GLSS controller, may need to exercise or change filtering policy rules locally without burdening the central GLSS controller, particularly where different subscribers have different filtering preferences. In any case, if the new subscriber notification is determined to be relevant, it is output to the receiver at step 655. Otherwise, if the notification is not relevant, the notification is excluded. For example, the filtering policy may exclude notifications from vehicle(s) that are outside of a pre-determined distance threshold from the receiving vehicle and/or the incident location, that would exceed a certain threshold number of vehicles, or some combination thereof. As an illustration, an EMS vehicle approaching an incident site may not wish to receive subscriber notification of a fifth police officer 1 mile away, particularly when three other police vehicles have already arrived at the site.

In the case of a de-subscription notification (block 641), the de-subscribing unit is removed from the group location output buffer in step 643 and filtered for relevancy in blocks 635, 645. If the de-subscription is determined to be relevant to the receiver, it is output at step 655 in similar, albeit reverse, fashion as new subscriber notifications. For example, if the subscription had been shown as an icon on a map display, the de-subscription should be communicated by at least removing the icon of the de-subscribing unit from the map display. Optionally, the change on the map display may be accompanied by sound and/or light effect(s) to alert the driver of the change. It is noted, in the instance that a de-subscription notification is received from a subscriber that was not communicated to the receiver (i.e., the subscription notification had been filtered out), the de-subscription notification is generally also filtered out, unless some important attribute or location data of the transmitting subscriber unit has significantly changed since the filtering criteria was first applied. The importance of the de-subscription output on the user interface here again depends on the location and on the subscriber attributes of the sending mobile and on other, external factors, such as the location and the attributes of the receiving unit, and the status of the incident resolution.

In the case of a new location update (block 651), the new subscriber location is updated in the group location output buffer at step 653 and filtered for relevancy in blocks 635, 645. As has been described, the filtering policy is designed to exclude or filter out certain low-priority information, thereby communicating relatively high-priority information to the receiving subscriber so as to reduce the cognitive load on the user and put more emphasis on the most important changes. New location updates having low priority are discarded, whereas new location updates having significant relevance/priority are output to the user at step 655, for example, by flashing icons, speech, text or generally any manner. An example of a high-priority location change could be the arrival of a firefighter truck to an incident site reported to the police chief in charge for the resolution of the incident. A low-priority location change could be that of an advancing police car ½ mile away from the incident location that has not crossed a new intersection since the last transmitted location update while two other police cars have already arrived at the incident site.

If the notification is a response to a subscriber's own request (block 605), the process varies depending on the type of request. The request may comprise a location update request (block 609) a service initiation or subscription request (block 611) or a de-subscription request (block 613).

In the case that the notification is in response to a location update request, the location output buffer is updated at step 653 and, subject to filtering for relevance at steps 635, 645, the location update may be output at step 655 to the requesting device.

In the case that the notification is in response to a service initiation or subscription request (block 611) from the subscriber, the subscriber checks at step 661 if the response is a positive acknowledgement ("request accepted") or a rejection of the request. If the response is a rejection, the subscriber marks an indication of the request failure in the device output buffer at step 663, resets the pending initiation status at step 665 and outputs the contents of the group location output buffer at step 655. The physical realization of this buffer output depends on the device configuration and input-output provisioning option. Typically, it is map-display with the vehicle's own location shown as an icon while an audio-visual indication of the failed location sharing is provided. This audio-visual indication may include the flashing of the vehicle icon with a certain color, lighting a separate indicator light, replaying a prerecorded speech fragment, sounding a special chime or a combination of the above. Alternatively, rejected subscriptions are communicated to the user with audio only, e.g., by a sound effect, voice recording or the like. Then, the algorithm exits, until such time as a new "Request Location Sharing" signal is received. If the response is a positive acknowledgment ("acceptance"), the subscriber marks an indication of the acceptance in the device output buffer at step 671 and the acceptance is also communicated to the device user at step 655. The device sets a GLSS initiated or subscribed to status at step 673 and enables periodic location transmissions to other subscribers at step 675 through the GLSS controller.

In the case that the notification is in response to a de-subscription request, the location output buffer is cleared at step 681, the GLSS initiated or subscribed to status is cleared at step 683 and the periodic location transmissions to other subscribers is canceled at step 685. At step 655, the group location output buffer is output to display the de-subscribed status. Depending on the configuration of the navigation unit and on the GLSS service initiation/subscription request attribute profile, the display may still show the last location of the participating group members after performing the step 655. But no new updates are accepted for display and it may remove all units from the map except of its own which is still being tracked. Alternatively, the whole map-based location display and tracking can be terminated entirely.

Figure 7:
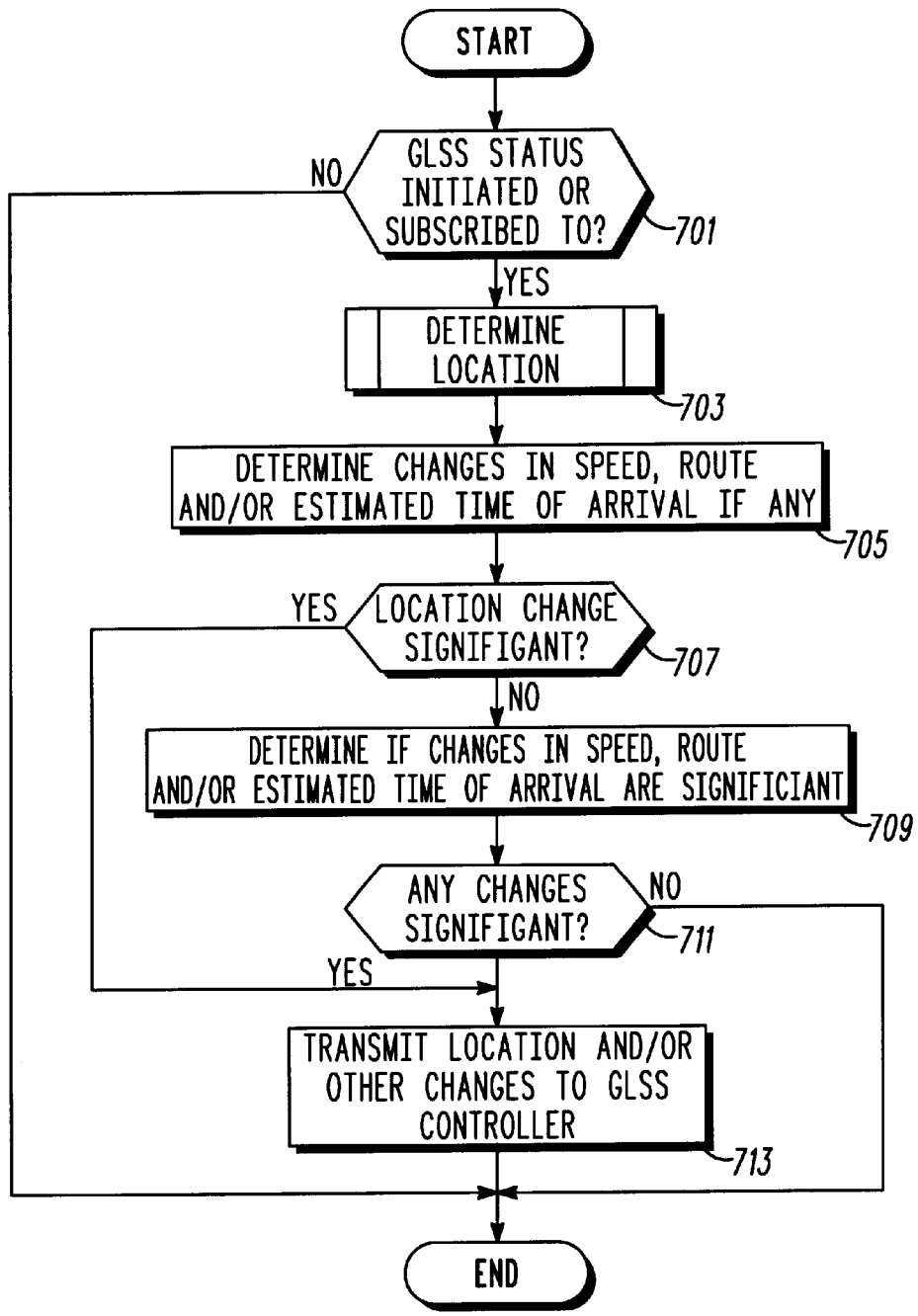
FIG. 7 is a flowchart showing an algorithm for processing periodic location updates from GLSS clients.

Now turning to FIG. 7, there is shown an algorithm for processing periodic location updates (e.g., time/distance increment signals) from GLSS clients according to one embodiment of the invention. In one embodiment, the algorithm is executed periodically upon elapse(s) of a time interval for devices having an initiated or subscribed to GLSS status. This latter condition is determined in step 701. If the device is in a different state, periodic notifications will not be sent out until the device transitions to an initiated or subscribed-to status. Each subscriber unit participating in the GLSS periodically determines its own location at step 703 (i.e., using its location determination element) and checks if any changes in its location data since the previously transmitted location data are significant enough to warrant a transmission to the GLSS controller. The changes may comprise changes in location, speed, route and/or estimated time of arrival, etc. as shown at steps 705, 707, 709. The evaluation of the changes for significance is performed at step 711, based on the rule sets in the filtering policy that has been previously selected for this group location sharing service. If the change in the location data compared to the last reported location is significant enough according to the filtering policy for this particular subscriber, the location data is transmitted to the GLSS controller at step 713.

In the preferred embodiment, the GLSS service is implemented as a supplementary service of a talkgroup call supported by commercially widely used dispatch or two-way wireless communication systems. As will be appreciated, the tightest integration of the two services occurs when all of the members of the talkgroup call participate in the GLSS service. In such case, the initiation or subscription to the GLSS service advantageously will occur coincident with participation in the talkgroup call; and, similarly, the termination of the GLSS service will occur coincident with termination of the talkgroup call. That is, whoever subscribes to the GLSS service automatically participates in the talkgroup call, and whoever de-subscribes from the GLSS service automatically terminates their participation in the talkgroup call, and vice versa. Optionally, GLSS membership may be resurrected if the initiator or some of the subscribers to the last GLSS start a talkgroup call instance, e.g., by re-activating the GLSS within a certain time threshold after the termination of the last talkgroup call instance. The re-activated GLSS and talkgroup may have the same membership constraints as the previous service instances had. That is, reactivated talkgroup service may cause GLSS service to be available to all preconfigured talk-group members assigned to the talkgroup voice channel. As still another alternative, GLSS subscription invitations may be constrained to current talkgroup members only, but the subscription(s) to the GLSS are optional. In this case the GLSS membership is a subset of the talkgroup membership and remains a subset until either of the two services terminate. If the GLSS terminates first, the talkgroup call can continue as it was before the GLSS was initiated. If a client de-subscribes from the GLSS, it may continue to participate in the talkgroup call.

Figure 8A:
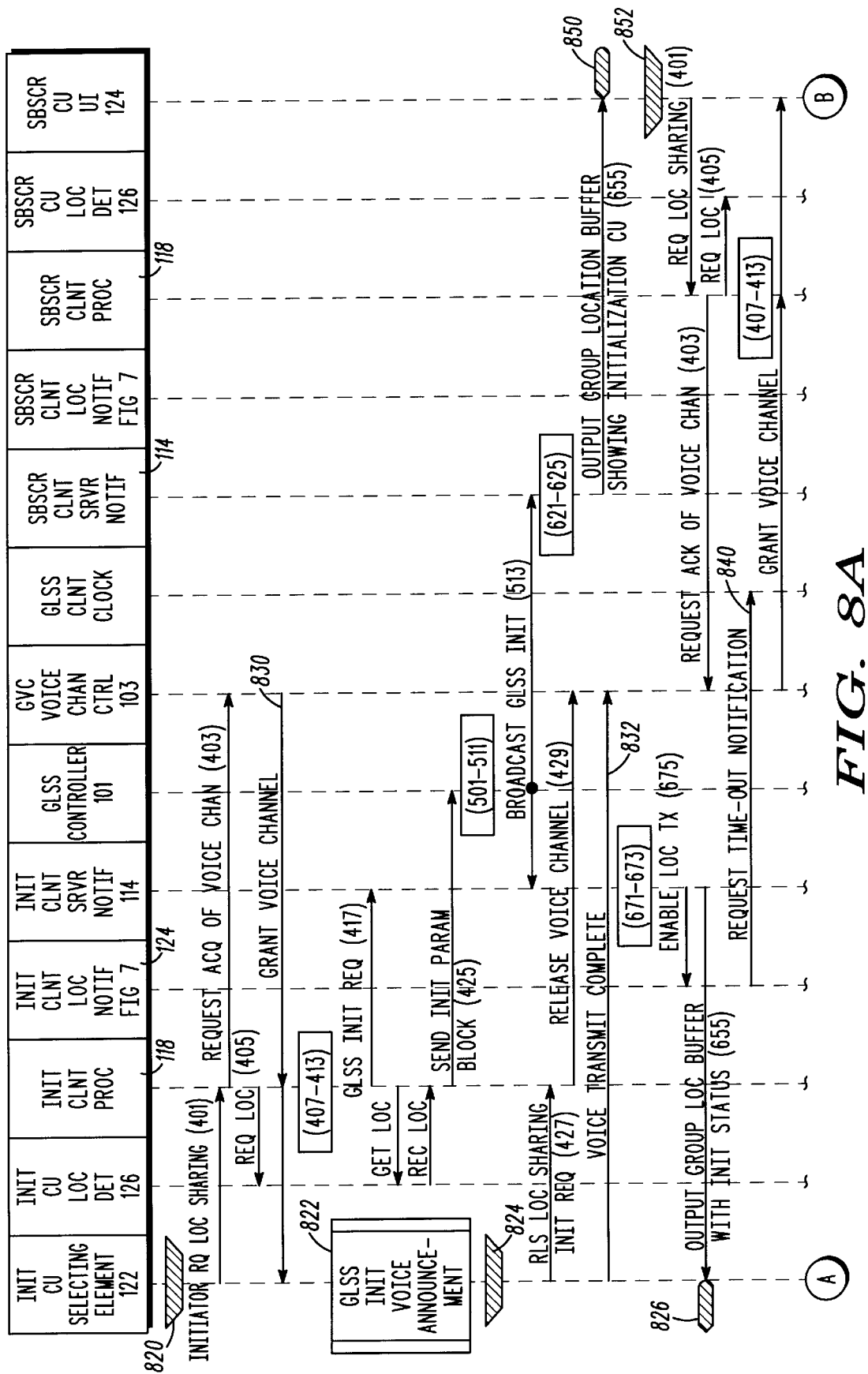
FIG. 8 is a message sequence chart showing example GLSS service initiation, subscription and location update notifications.
Figure 8B:
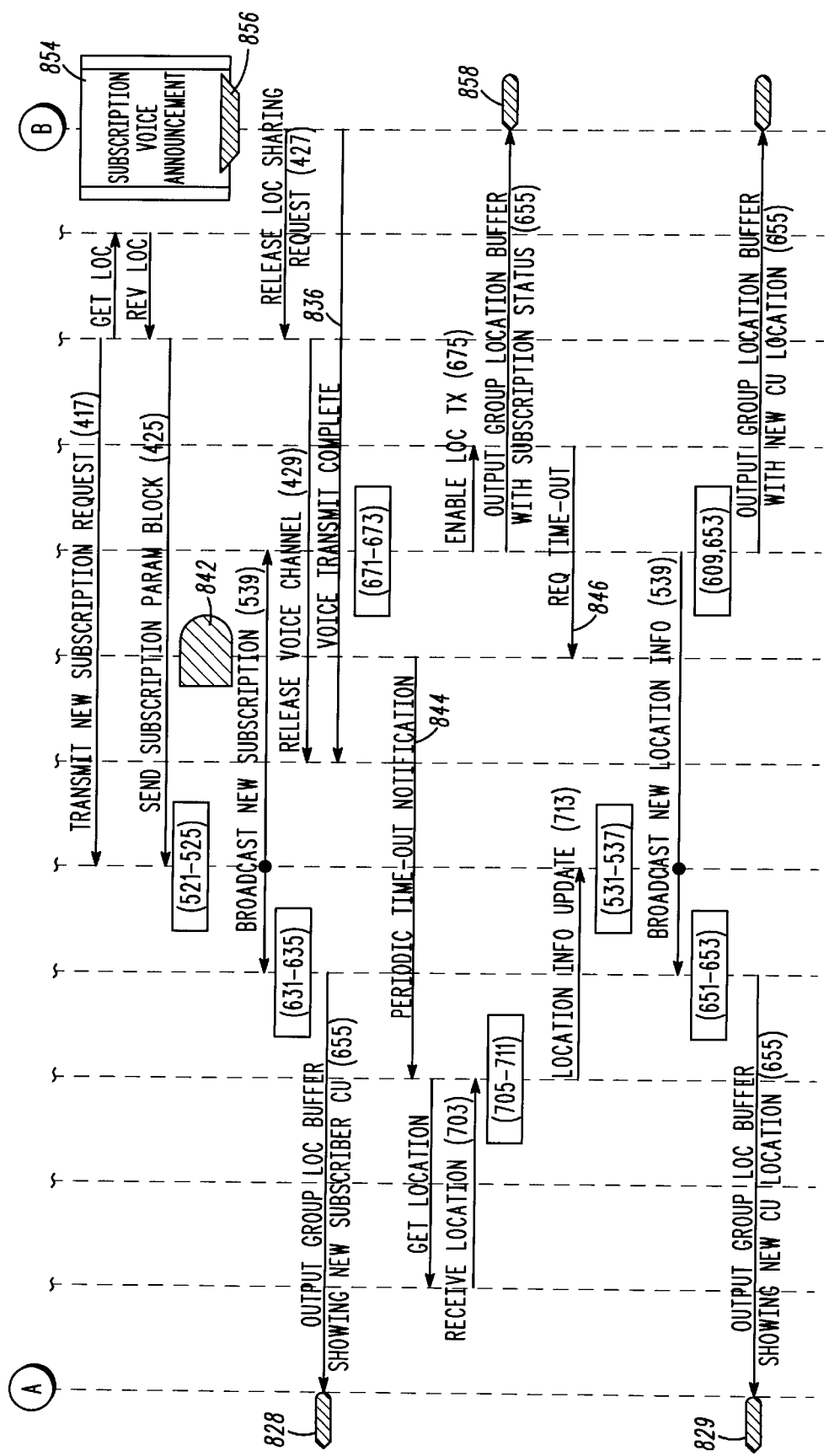

An example message sequence associated with a GLSS service implemented with devices engaged in a talkgroup call is shown in FIG. 8. For convenience, like reference numerals will be used, where appropriate, for like elements and/or method steps described in relation to FIGS. 1–7. The message sequence begins at block 820 when an initiating client exercises his/her selection element 122 to request location sharing. As has been described in relation to FIG. 4, this might be accomplished by the user simultaneously depressing push-to-talk (PTT) and GLSS button(s) of the client device. This causes the selection element 122 to send a Request Location Sharing message 401 to the processor 118 of the client device ("Init Clnt Proc"). In turn, the processor 118 causes a message 403 to be sent to the infrastructure 103 ("GVC Voice Chan Ctrl") requesting acquisition of a voice channel for a group voice call; sends a Request Location message 405 to the location determination element 126 of the client device; and sends a GLSS initiation request message 417 to the GLSS controller 101. The steps 407–413 (FIG. 4) are exercised to assign a GLSS initiated status to the initiating client device.

Upon assigning a voice channel for the call, the infrastructure 103 returns a call grant message 830 ("Grant Voice Channel") to the client device. Then, at block 822, the initiating client uses the assigned voice channel to announce the reason for starting the GLSS. As shown, the client processor 118 retrieves location data from the Location Determination Element 126 by sending a "Get Loc" message 421 and receiving in return a "Rcv Loc" message. After the location data is obtained, an initial GLSS announcement parameter message 425 is sent to the GLSS controller 101. The steps 501–511 (FIG. 5) are exercised by the GLSS controller 101 to create a group location table, as appropriate, and a GLSS initiation announcement message 513 is broadcast from the GLSS controller 101 to all potential subscribers. The prospective subscribers execute steps 621–625 (FIG. 6) to record the GLSS initiation in their respective group location output buffers, which buffers are sent to the receiving subscribers' operator interfaces 124 (e.g., displays) via message(s) 655 (one shown). Accordingly, the prospective subscribers may observe an announcement location icon on their displays while they decide to respond or not respond to the GLSS initiation message 513. Optionally, the icon may remain until such time it is deleted by the operator or until a predetermined time-window elapses according to the service provisioning or user preference parameters. Any receiving potential subscribers that are also participating in the group voice call with the initiating client will also receive the GLSS announcement voice transmission depicted at block 822.

Some time after the voice announcement and GLSS initiation announcement is complete, the initiating client releases the PTT/GLSS request button(s) at block 824. This causes the selection element 122 to send a Release Location Sharing message 427 to the processor 118. The processor 118, in turn, sends a Release Voice Channel message 429 and the initiating client sends a Voice Transmit Complete message 832 to the infrastructure 103 ("GVC Voice Chan Ctrl"). The initiating subscriber executes steps 671–673 (FIG. 6) to set a "GLSS initiated" status, thereby enabling periodic location transmissions 675 to the network. The group location output buffer is output to the initiating subscriber via message 655 to display an indication of the GLSS initiated status. In the case where location updates are to be provided at periodic time intervals, the initiating subscriber requests via message 840 a time-out notification from an internal clock ("GLSS Clnt Clock").

Block 852 represents a prospective subscriber indicating his/her desire to subscribe to the already initiated GLSS service. Similarly to initiation of the service by the initiating subscriber, this may be accomplished by the user simultaneously depressing push-to-talk (PTT) and GLSS button(s) of his/her communication unit. This causes a Request Location Sharing message 401 to be sent to the processor 118 of the subscriber device ("Sbscr Clnt Proc"). The processor 118 causes a message 403 to be sent to the infrastructure 103 requesting acquisition of a voice channel; sends a Request Location message 405 to the location determination element 126 of the subscriber device; and sends a new subscription request message 417 to the GLSS controller 101. The steps 407–413 (FIG. 4) are exercised to assign a GLSS subscribing status to the subscribing client device.

Upon assigning a voice channel for the call, the infrastructure 103 returns a call grant message 834 ("Grant Voice Channel") to the subscribing client device. Then, at block 854, the subscribing client uses the assigned voice channel to make a voice announcement to the other subscribers participating in the group voice call. As shown, the subscribing client processor 118 retrieves location data from its Location Determination Element 126 by sending a "Get Loc" message 421 and receiving in return a "Rcv Loc" message. After the location data is obtained, a GLSS subscription parameter message 425 is constructed and sent to the GLSS controller 101. The steps 521–525 (FIG. 5) are exercised by the GLSS controller 101 to register the new subscription and insert the new subscriber in its group location table, as appropriate and, subject to filtering for relevance, the new subscription is broadcast 539 to all subscriber devices in the group location table. The receiving subscribers execute steps 631–635 (FIG. 6) to record the new subscriber in their respective group location output buffers which, subject to filtering for relevance, are sent to the receiving subscribers' operator interfaces 124 (e.g., displays) via message(s) 655 (one shown).

Some time after the voice announcement and new subscription announcement is complete, the newly subscribing client releases the PTT/GLSS request button(s) at block 856. This causes the selection element 122 to send a Release Location Sharing message 427 to the processor 118. The processor 118, in turn, sends a Release Voice Channel message 429 and the subscribing client sends a Voice Transmit Complete message 836 to the infrastructure 103 ("GVC Voice Chan Ctrl"). The subscribing client executes steps 671–673 (FIG. 6) to set a "GLSS subscribed to" status, thereby enabling periodic location transmissions 675 to the network. The group location output buffer is output to the new subscriber via message 655 to display an indication of the GLSS subscribed to status. In the case where location updates are to be provided at periodic time intervals, the new subscriber requests via message 846 a time-out notification from an internal clock ("GLSS Clnt Clock")

Upon any subscriber (e.g., initiating subscriber shown) receiving a time out notification 844, it knows to provide a location update to the GLSS controller 101. As shown, the initiating subscriber retrieves location data from its Location Determination Element 126 by sending a "Get Loc" message and receiving in return a "Rcv Loc" message 703. The subscriber executes steps 705–711 (FIG. 7) to evaluate the significance of the location data and, if the location data is determined to be significant, a location information update message 713 is sent to the GLSS controller. The GLSS controller executes steps 531–537 (FIG. 5) to update its group location table, as appropriate and, subject to filtering for relevance, the new location information is broadcast 539 to all subscriber devices in the group location table. The receiving subscribers execute steps 651–653 or 609, 653 (FIG. 6) to update their respective group location output buffers which, subject to filtering for relevance, are sent to the receiving subscribers' operator interfaces 124 (e.g., displays) via message(s) 655 (two shown).

Group Routing

As will be appreciated, the broadcast location information 539 may include route information. The dissemination of route information to other group members may result in revising their optimal route at the receiving side. The purpose of such route changes in response to receiving route changes from the broadcasting unit could be reducing the degree of freedom of the fleeing vehicle, improving the coverage by the overall group, optimizing the fleet resources, such as fuel, personnel time, etc. As a result, a change in a single route could trigger a chain-reaction of route changes each of them rebroadcast to the entire group. In this way, distributed group route-optimization algorithms can be implemented. The quality of these algorithms is measured in the convergence time and in the optimization gains. Preset thresholds can bound these criteria and a new route change is accepted for inclusion and for broadcast only if the criteria thresholds are met.

The optimized route recalculation can be performed automatically or with human assistance using the computer display in the vehicle or at a central, fixed site. When manual human assistance is used, the group route optimization can be augmented by a group voice-call or by a group multimedia call service between the subscribing group members. These supplementary group calls can augment and focus the automatic group route optimization process by linking in the human element of negotiation and they can significantly reduce the possibility of "exponential explosions" in the group route changes. The supplementary dispatch call can also be initiated automatically when new route configurations are likely to result in a better optimum. Detecting an optimization criterion value change reaching a predetermined threshold would recognize such need for a supplementary dispatch call. In this way, the group route subscriptions and broadcasts will significantly improve the overall efficiency of the fleet operation.

When negotiating a new, optimum fleet route assignment, possible alternatives can be calculated and visualized on the in-vehicle displays of the group members. The alternative route selections can be visually or otherwise annotated by ETA values and/or by any other route performance quantitative determinations. The possible alternatives can relate to the individual members separately, or possible alternatives of the overall sets of routes for the entire fleet may be displayed. In either case, the end result of the negotiation is a single set of routes, one per each group members. The resulting single set can be produced by simply selecting among the alternatives, by manually modifying the existing routes or by the combination of both.

The on-going route sharing between the group members opens up the possibility of savings by reusing each other's routes. For example, when two group members with nearby current location need to reach a common destination point, the route for the second member can be significantly simplified by "snapping" his route to the closest point of the first member's route. This could also improve the overall quality of the overall set of routes. In addition, it would also reduce the computational need for the overall route calculations. For example, a convoy of vehicles sharing a route could make the accomplishment of the mission safer. An opposite example would be to spread the routes as much as possible in order to improve the geographic coverage or for reducing the visibility of the operation along the specific routes, etc.

The present disclosure has therefore described a group location and/or route sharing service (GLSS) that may be implemented supplementary to a group voice ("talkgroup") call service. The GLSS may be invoked based on a voluntary event declaration and subscription(s) by subscriber(s) or by a third party GLSS controller on behalf of certain subscribers. The GLSS may also be invoked in response to other types of mobile group communication services, such as voice broadcast, multimedia calls, voice-based instant-message chat-groups, and conference calls.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method comprising a communication unit engaged in group dispatch voice call performing steps of:
   receiving a message initiating a location sharing service associated with an event;
   responsive to receiving the message, selectively subscribing to the location sharing service, yielding a subscription for the event, the subscription being required to resolve a location of the event; and
   receiving, responsive to the subscription, location information associated with the event.

2. The method of claim 1, wherein the communication unit comprises one of: a mobile display-based terminal and a portable display-based terminal, the method further comprising the communication unit displaying at least a portion of the location information.

3. The method of claim 1, wherein the step of receiving location information comprises receiving periodic location information associated with a group comprising a plurality of communication units having subscribed to the location sharing service.

4. The method of claim 3, further comprising:
   sending, by the communication unit, location information associated with the event.

5. The method of claim 4, wherein the step of sending location information comprises sending periodic location information associated with the communication unit's own location to a group comprising a plurality of communication units having subscribed to the location sharing service.

6. The method of claim 1, wherein the step of subscribing to the location sharing service comprises:
sending a subscription request to a controller; and
receiving, from the controller, a subscription grant message.

7. The method of claim 1, wherein the step of subscribing to the location sharing service is accomplished by a third party, on behalf of the communication unit.

8. The method of claim 1, further comprising steps of:
de-subscribing to the location sharing service; and
responsive to the step of de-subscribing, discontinuing receiving location information associated with the event.

9. The method of claim 8, wherein the step of de-subscribing to the location sharing service comprises:
sending a de-subscription request to a controller; and
receiving, from the controller, a de-subscription acknowledgement message.

10. The method of claim 9, wherein the step of sending a de-subscription request comprises sending a de-affiliation request for a talkgroup.

11. The method of claim 1, wherein the communication unit is a member of a talkgroup, the step of receiving a message comprising receiving a voice communication announcing the location sharing service from an initiating member of the talkgroup.

12. A method comprising:
subscribing, by a group comprising a plurality of talkgroup members engaged in a group dispatch voice call, to a group location sharing service, yielding a corresponding plurality of subscriptions, the subscriptions being required to resolve a location of the event;
determining respective service levels associated with the subscriptions; and
exchanging periodic location information between the plurality of talkgroup members based on the respective service levels.

13. The method of claim 12, wherein the service levels include an information transmission service level and an information reception service level.

14. The method of claim 13, wherein the service levels include an event participation level, the information transmission service level and information reception service level being based on the event participation level.

15. The method of claim 13, wherein the information transmission service level defines at least one of: amount, type and liming of information to be sent from a sourcing talkgroup member, and wherein the information reception service level defines at least one of: amount, type and timing of information to be received by a receiving talkgroup member.

16. The method of claim 12, wherein the step of exchanging periodic location information comprises exchanging location information associated with a talkgroup member in response to a change in location of the talkgroup member exceeding a threshold value.

17. The method of claim 12, wherein the step of exchanging periodic location information comprises exchanging location information associated with a talkgroup member in response to a location of the talkgroup member being within a geographic reference area.

18. The method of claim 12, wherein the step of exchanging periodic location information comprises exchanging location information associated with a talkgroup member in response to a change in speed of the talkgroup member exceeding a threshold value.

19. The method of claim 12, wherein the step of exchanging periodic location information comprises exchanging location information associated with a talkgroup member in response to deviations in route of the talkgroup member exceeding a threshold value.

20. The method of claim 12, wherein the step of exchanging periodic location information comprises exchanging location information associated with a talkgroup member in response to deviations in travel time of the talkgroup member exceeding a threshold value.

21. In a communication system including a plurality of communication units distributed among a plurality of locations and engaged in a group dispatch voice call, the communication units being eligible for movement causing changes in the plurality of locations, a method comprising the steps of:
sending, from a first communication unit of the plurality of communication units to one or more receiving communication units of the plurality of communication units, a message initiating a group location sharing service, yielding a subscription for the event, the subscription being required to resolve a location of the event;
subscribing, by one or more of the receiving communication units, to the group location sharing service, thereby forming a group of participating units including the first communication unit and the one or more of the receiving communication units; and
receiving, by a first plurality of the participating units, responsive to the step of subscribing, periodic location update information associated with a second plurality of the participating units.

22. A wireless communication unit comprising:
a radio frequency transceiver, operable to send and receive messages initiating an event-based location sharing service;
a selection element enabling an operator, responsive to receiving a message initiating an event-based location sharing service, to selectively subscribe to the event-based location sharing service yielding a subscription for the event-based location, the subscription being required to resolve a location of an event, thereby enabling the radio frequency transceiver to receive location information associated with an event; and an operator interface, operably connected to the transceiver, for communicating at least a portion of the location information to the operator.

* * * * *